(12) United States Patent
Plested et al.

(10) Patent No.: US 10,106,185 B2
(45) Date of Patent: Oct. 23, 2018

(54) COLLAPSIBLE STROLLER WITH TRIGGER HANDLE

(71) Applicant: Diono, LLC, Sumner, WA (US)

(72) Inventors: Nigel Plested, London (GB); Paul Richardson, London (GB)

(73) Assignee: Diono, LLC, Sumner, WA (US)

( * ) Notice: Subject to any disclaimer, the term of this patent is extended or adjusted under 35 U.S.C. 154(b) by 6 days.

(21) Appl. No.: 15/670,378

(22) Filed: Aug. 7, 2017

(65) Prior Publication Data

US 2018/0043917 A1 Feb. 15, 2018

Related U.S. Application Data

(60) Provisional application No. 62/373,207, filed on Aug. 10, 2016.

(51) Int. Cl.
*B62B 1/00* (2006.01)
*B62B 7/06* (2006.01)
*B62B 7/08* (2006.01)
*B62B 9/20* (2006.01)

(52) U.S. Cl.
CPC .............. *B62B 7/068* (2013.01); *B62B 7/083* (2013.01); *B62B 9/20* (2013.01); *B62B 2205/18* (2013.01); *B62B 2205/22* (2013.01)

(58) Field of Classification Search
CPC .......... B62B 3/007; B62B 5/08; B62B 5/082; B62B 5/085; B62B 7/00; B62B 7/002; B62B 7/004; B62B 7/006; B62B 7/08; B62B 7/086; B62B 7/068; B62B 7/06; B62B 7/062; B62B 7/066; A61G 5/08
See application file for complete search history.

(56) References Cited

U.S. PATENT DOCUMENTS

| 5,205,579 | A | 4/1993 | Kato et al. |
| 5,823,564 | A * | 10/1998 | Kettler .................... B62B 7/10 |
| | | | 280/642 |
| 6,068,284 | A | 5/2000 | Kakuda |
| 6,102,431 | A | 8/2000 | Sutherland et al. |
| 6,422,587 | B1 | 7/2002 | Yamazaki et al. |
| 6,485,216 | B1 | 11/2002 | Cheng |
| 6,752,413 | B2 | 6/2004 | Yamazaki et al. |
| 7,007,968 | B2 | 3/2006 | Yamazaki et al. |
| 7,780,183 | B2 | 8/2010 | Chen et al. |
| 8,128,119 | B2 | 3/2012 | Saville et al. |
| 8,157,286 | B2 | 4/2012 | Lai |

(Continued)

OTHER PUBLICATIONS

International Search Report and Written Opinion for PCT/US2017/045913; dated Oct. 19, 2017.

*Primary Examiner* — John D Walters
*Assistant Examiner* — James J Triggs
(74) *Attorney, Agent, or Firm* — Stetina Brunda Garred and Brucker; Mark B. Garred

(57) ABSTRACT

A collapsible stroller is disclosed, including a front axle frame member, a rear axle frame member, a handlebar frame member, a handlebar, and a hub. The hub includes a rotating attachment point for the front axle frame member, a rotating attachment point for the handlebar frame member, a fixed attachment point for the rear axle frame member. A cable connects the hub, and a rotatable handle on the handlebar frame member. When the rotatable handle is rotated, the cable causes the hub to collapse in two stages.

19 Claims, 11 Drawing Sheets

(56) References Cited

U.S. PATENT DOCUMENTS

| | | |
|---|---|---|
| 8,205,907 B2 | 6/2012 | Chicca |
| 8,500,152 B2 * | 8/2013 | Thorne ................ B62L 37/002 280/642 |
| 8,517,412 B2 | 8/2013 | Tsai et al. |
| 8,590,919 B2 | 11/2013 | Yi |
| 8,596,669 B2 | 12/2013 | Liao |
| 8,714,581 B2 | 5/2014 | Fritz et al. |
| 8,870,213 B1 | 10/2014 | Ku |
| 8,876,147 B2 | 11/2014 | Chicca |
| 8,899,613 B2 | 12/2014 | Cheng |
| 8,905,428 B2 | 12/2014 | Schroeder et al. |
| 8,961,057 B2 | 2/2015 | Schroeder |
| 8,991,854 B2 | 3/2015 | Greger et al. |
| 9,044,104 B2 | 6/2015 | Smith |
| 9,085,312 B2 | 7/2015 | Liu |
| 9,193,373 B2 | 11/2015 | Fjelland et al. |
| 2003/0075902 A1 | 4/2003 | Hsia |
| 2010/0127480 A1 | 5/2010 | Ahnert et al. |
| 2014/0056638 A1 | 2/2014 | Wu et al. |

* cited by examiner

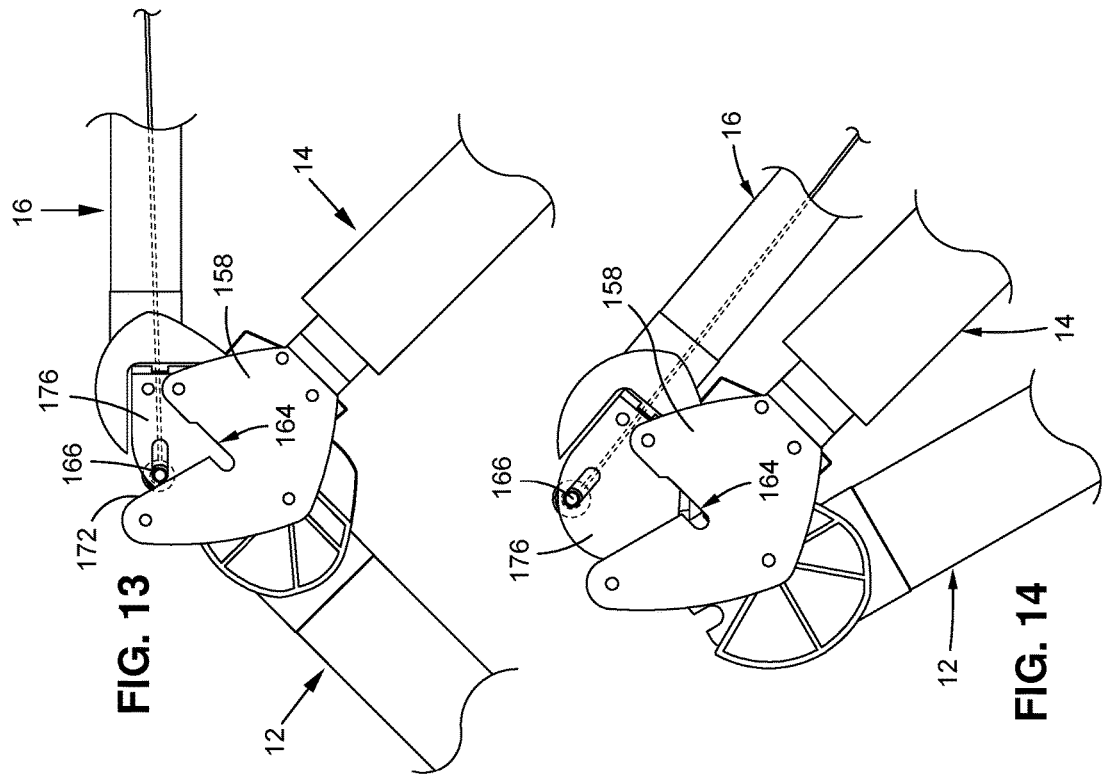
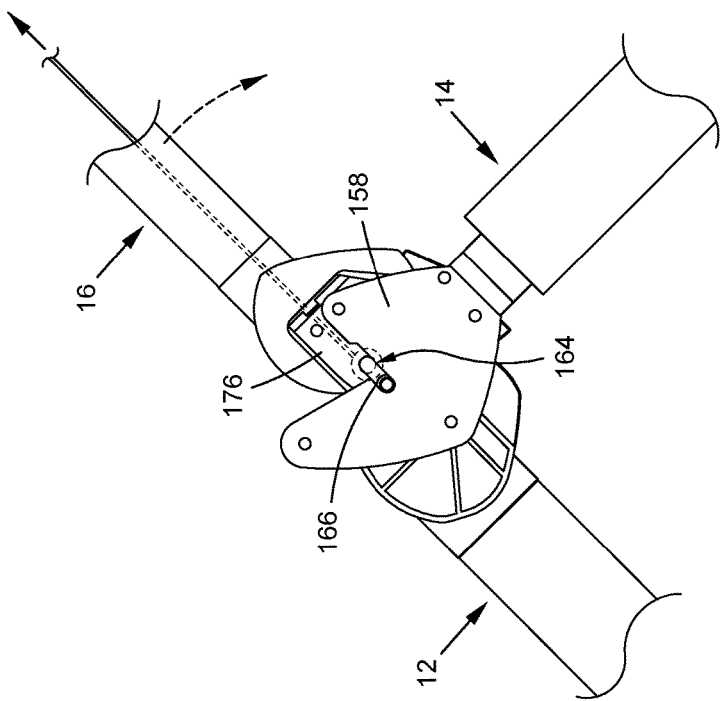
FIG. 12
FIG. 13
FIG. 14

COLLAPSIBLE STROLLER WITH TRIGGER HANDLE

CROSS-REFERENCE TO RELATED APPLICATIONS

This application claims the benefit of U.S. Provisional Application Ser. No. 62/373,207, filed Aug. 10, 2016, the contents of which are expressly incorporated herein by reference.

STATEMENT RE: FEDERALLY SPONSORED RESEARCH/DEVELOPMENT

Not Applicable

BACKGROUND

1. Technical Field

The disclosure generally involves strollers for infants, and specifically, folding or collapsible strollers.

2. Description of Related Art

Strollers, also referred to as push-chairs or prams, are commonly used to transport infants or toddlers. Foldable strollers offer the advantage of being easy to stow when not in use.

All-terrain baby strollers having a folding mechanism are known in the art. An exemplary stroller comprises a foldable, tubular metal frame with a transversely extending rear axle assembly and a front wheel. The tubular frame includes left and right folding assemblies. Each of the folding assemblies includes two rotatable members, each having a disk with a notch and an arm; one arm being connected to the stroller handle and the arm being connected to the front wheel frame. The rotatable members, along with corresponding rear wheel supports, are contained between housing halves that allow the arms to protrude outside of the housing. The inside wall of each half of the housing has a recess sized and shaped such that when the two halves of the housing are positioned together, the recesses form a cavity to securely receive the upper free-end portion of the rear wheel support. The disks are rotatable about a common bushing and may be interlocked by means of a spring-loaded tip mounted on the rear wheel support. The stroller may be folded by retracting the tip from the notches and rotating the disks with respect to one another, such that the front wheel support and the handle support are moved into close proximity to the rear wheel support.

Baby strollers having folding mechanisms are also known in the art. An exemplary folding mechanism includes a folding assembly having a first and second rotatable members rotatably mounted on an axle to rotate relative to each other. The first rotatable member is positioned for rotation in a first rotation plane and the second rotatable member is positioned for rotation in a second rotation plane, the first and second rotation planes are spaced apart. The first rotatable member has a first gear and the second rotatable member has a second gear. The folding assembly further has a third gear and a fourth gear configured to rotate together as a unit. The third gear is positioned in driving engagement with the first gear and the fourth gear is positioned in driving engagement with the second gear so that the first rotatable member and the second rotatable member rotate relative to each other in geared coordination.

The state of the art also includes a collapsible stroller having a frame with two so-called cam-fold units. Each cam-fold unit includes an inverse cam comprising a follower and a motion-transfer pin. Each of cam-fold units is coupled to the pusher handle and to the front wheel assembly and the rear wheel assembly. Each cam-fold unit includes a cam-support base, an inverse cam including a follower and a motion-transfer pin, and a pin mover. The cam-support base is coupled to the rear wheel assembly. The follower is coupled to the front wheel assembly so that the front and rear wheel assemblies move relative to one another when the follower is moved, by movement of the motion-transfer pin and pin mover. The pin mover is coupled to the pusher handle so that the pin mover moves relative to the rear wheel assembly to cause relative movement of the motion-transfer pin, follower, and front wheel assembly relative to the rear wheel assembly when the pusher handle is moved by a user relative to the rear wheel assembly.

Based on the foregoing, there is a need for a collapsible stroller with a less complex design that is, at the same time, more user friendly. While all strollers can be pushed and roll on wheels, which is the stroller's primary purpose, many times getting a child in and out of the stroller can be difficult, and prior art strollers overlook this aspect.

BRIEF SUMMARY

This disclosure describes a collapsible stroller with a simple design. The design includes features that make the attachment to, and removal of, a basket or seat to the stroller frame much more user friendly.

The disclosed stroller includes a front axle frame member, a rear axle frame member, a handlebar frame member, a cable, a spring, and a spaced pair of identically configured hub assemblies. Each hub assembly includes a rotating attachment point for the front axle frame member, a rotating attachment point for the handlebar frame member, a fixed attachment point for the rear axle frame member, a camming surface plate including a camming surface and a release pin engagement slot, and a release pin located partially in a hub carrier including a connection point for one end of the cable, the hub carrier biased by the spring.

In order to actuate each hub assembly, the stroller further includes a rotatable handle on the handlebar frame member including a handle carrier connected to an opposite end of the cable. When the rotatable handle is rotated, the cable causes the hub carrier of each hub, against the bias of the spring, to move the release pin out of the release pin engagement slot and on to the camming surface, allowing the handlebar frame member to rotate until the handlebar frame member is substantially parallel to a surface on which the stroller is placed, at which a force of friction between the camming surface and the release pin is equal to a force of gravity on the handlebar frame member.

The stroller further includes a handle carrier guide plate with a helical groove in which the handle carrier moves when the rotatable handle is rotated. The helical groove translates the rotational motion of the handle in to lateral motion of the handle carrier.

More specifically, each stroller hub assembly further includes a hub base plate, a front axle hub rotational element attached to the hub base plate at a first attachment point, a handlebar hub rotational element attached to the hub base plate at a second attachment point, and a rear axle hub member. The rear axle hub member has a forward set of interlocking fingers, and a rear set of interlocking fingers. The front axle hub rotational element also has a set of interlocking fingers, and the handlebar hub rotational element also has a set of interlocking fingers. The front axle hub rotational element interlocking fingers interlock with the forward set of interlocking fingers of the rear axle hub, and the handlebar hub rotational element interlocking fingers interlock with the rear set of interlocking fingers of the rear axle hub.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 12 depicts portions of a stroller frame when the stroller frame is in the operational configuration;

FIG. 13 depicts portions of the stroller frame when the stroller frame is in a first phase of collapse, i.e., partially collapsed;

FIG. 14 depicts portions of the stroller frame when the stroller frame is in a fully collapsed configuration;

DETAILED DESCRIPTION

The detailed description set forth below in connection with the appended drawings is intended as a description of the presently preferred embodiment of a collapsible stroller, and is not intended to represent the only form in which it can be developed or utilized. The description sets forth the functions for developing and operating the stroller in connection with the illustrated embodiments. It is to be understood, however, that the same or equivalent functions may be accomplished by different embodiments that are also intended to be encompassed within the scope of the present disclosure. It is further understood that the use of relational terms such as first, second, distal, proximal, and the like are used solely to distinguish one from another entity without necessarily requiring or implying any actual such relationship or order between such entities.

Figure 1:
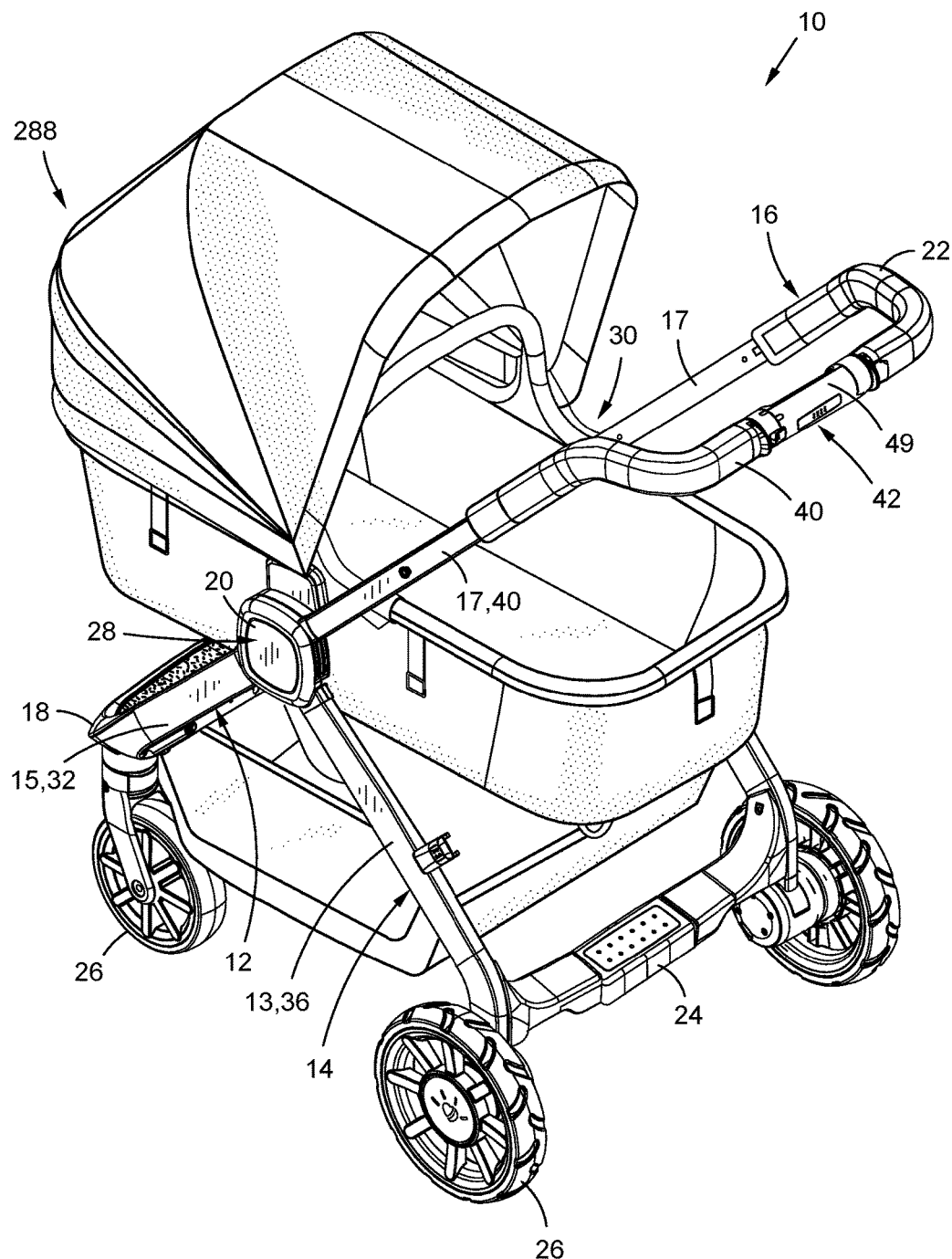
FIG. 1 is an upper perspective view of a collapsible stroller in an operational configuration.

FIG. 1 shows a side view of a collapsible stroller 10 in an operational configuration. In this configuration, the stroller 10 may be used to carry a small child (not shown). A spaced pair of identically configured hub assemblies 20 is central to the stroller 10. In the description which follows, one such hub assembly 20 will be described with particularity, those of ordinary skill in the art recognizing that such description is applicable to the remaining hub assembly 20 of the pair as a mirror image to the described hub assembly 20. In the stroller 10, extending from each hub assembly 20 are three frame elements, a front axle frame element 12, a rear axle frame element 14, and a handlebar frame element 16. When the stroller 10 is in the operational configuration, portions of the front axle frame element 12 and the handlebar frame element 16 are in alignment with one another, forming a generally straight line from the front axle 18 to the handlebar 22. At least a portion of the rear axle frame element 14 is substantially perpendicular to the front axle frame element 12 and the handlebar frame element 16 when the stroller 10 is in the operational configuration. When the wheels 26, two of which are connected to the front axle 18 and two of which are connected to the rear axle 24, are placed on an underlying surface, the aligned side members 15 of front axle frame element 12, and side members 17 of handlebar frame element 16 are at substantially a 45-degree angle to the underlying surface. The side members 13 of the rear axle frame element 14 are also at a substantially 45-degree angle to the underlying surface, but facing in an opposite direction.

In this application, the directional designations "right," "left," "distal," and "proximal" are from the perspective of a user pushing the stroller 10 by a handlebar 22. Except where noted, the stroller components are symmetrical. The symmetrical nature of the left 28 and right 30 side portions of the stroller 10 are more readily apparent in the perspective view of the stroller 10. The front axle frame element 12 includes left and right side members 32 and a front axle 18 extending between the left and right side member 32. Similarly, the rear axle frame element 14 includes a left and right side members 36, and a rear axle 24 extending between the left and right side members 36 of the rear axle frame element 14. The handlebar frame element 16 includes left and right side members 40, and the handlebar 22 which includes a trigger and twist handle 42.

Figure 2:
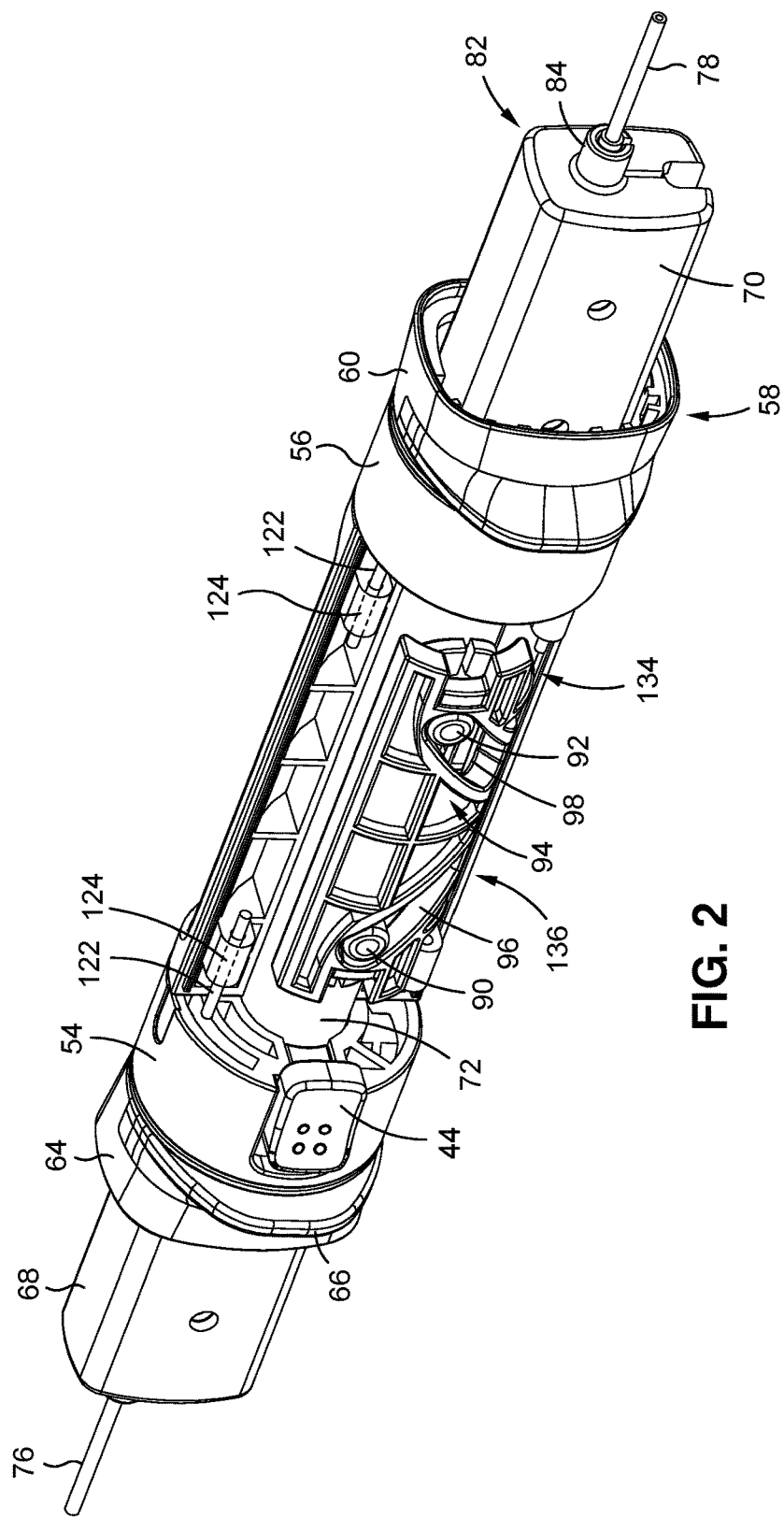
FIG. 2 is an upper perspective view of a partially disassembled trigger and twist handle of the stroller.
Figure 3:
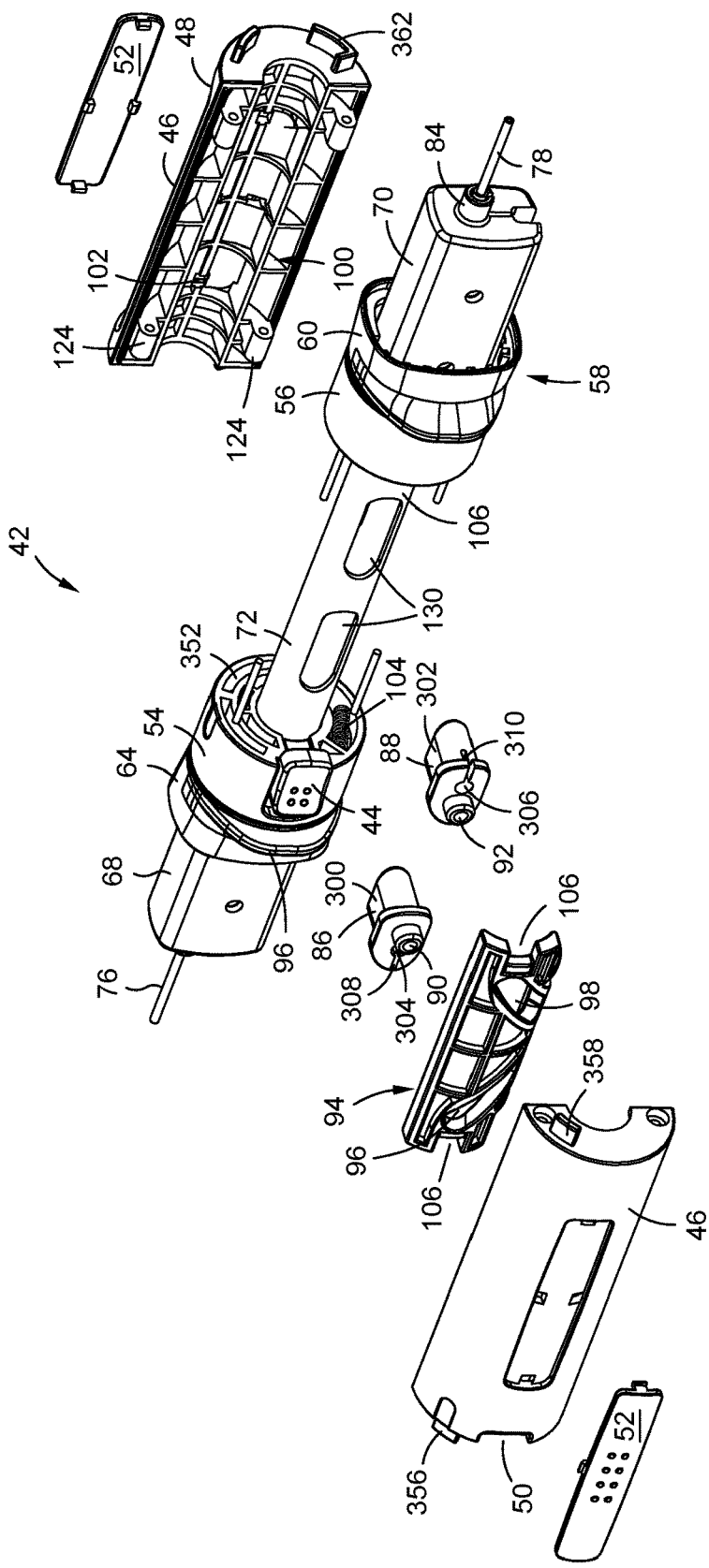
FIG. 3 is an exploded, front perspective view of the trigger and twist handle.
Figure 4:
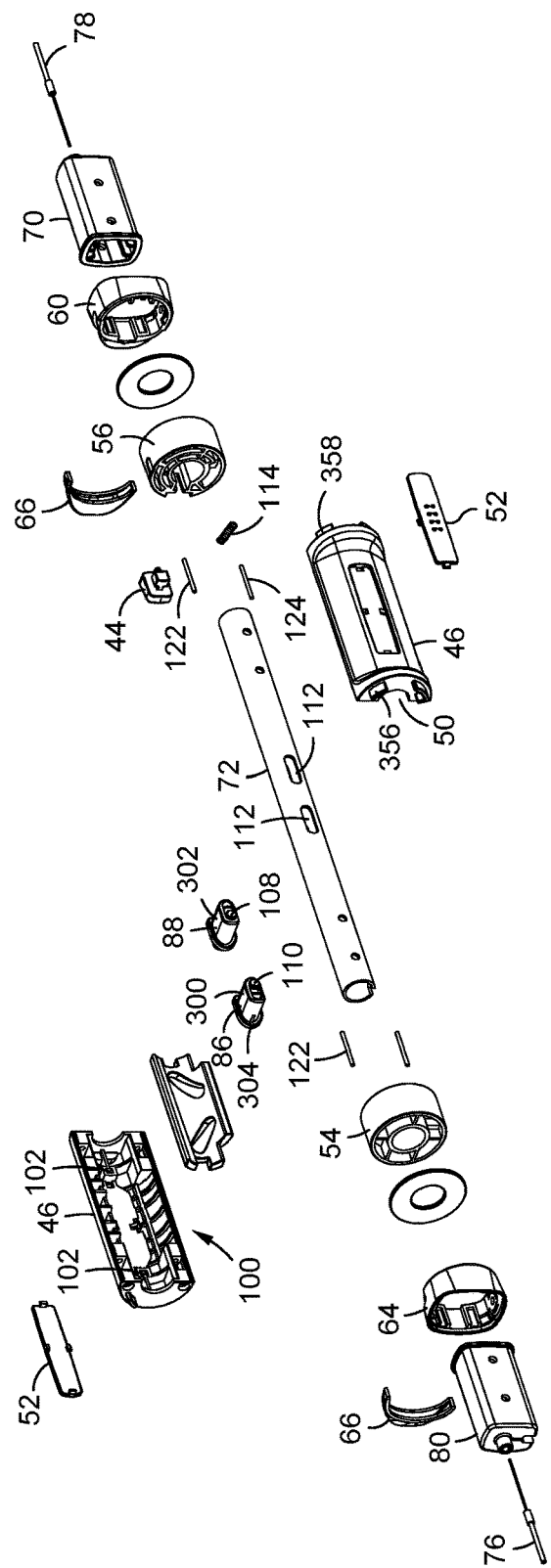
FIG. 4 is an exploded, rear perspective view of the trigger and twist handle

FIGS. 2 and 3 provides an overview of the trigger and twist handle 42. A user (not shown) may selectively grasp a proximal handle plate 46 and a distal handle plate 48 which collectively form an operative handle 49. The operative handle 49 is, in turn, connected to a handle carrier guide plate 94, which includes opposing helical grooves 96, 98 which direct the path of respective ones of a corresponding pair of carrier guides 90, 92. The carrier guides 90, 92 are connected to two handle carriers 86, 88 which are located in an interior of a handle tube 72. The handle tube 72 is supported by a left handle base 54 and a right handle base 56. A locking trigger 44 is mounted to the left handle base 54. A left hand end cap 64 is mounted to the outside of the left handle base 54. A right hand end cap 60 is mounted to the outside of the right handle base 56. At least partially internal to the left hand end cap 64 and also mounted to the outside of the left handle base 54 is a left housing 68, which supports the left end of the handle tube 72. At least partially internal to the right hand end cap 60 and also mounted to the outside of the right handle base 56 is a right housing 70, which supports the right end of the handle tube 72. Cables 76, 78 are connected to each of the handle carriers 86, 88, and pass through respective portions of the handle tube 72, respective handle bases 54, 56, in to respective housings 68, 70 and then exit the housings 68, 70 through a corresponding guide 84. In some embodiments, the proximal handle plate 46 and the distal handle plate 48 may include a textured outer surface 52, which enhances grip. In other embodiments, the outer surface 52 may be smooth. Further, in other embodiments there may be three or more handle plates.

FIG. 3 depicts the right handle carrier 88, and the left handle carrier 86 removed from the handle tube 72 for purposes of clarity, although when assembled, the left and right handle carriers 86, 88 reside within the handle tube 72. The left handle carrier 86 and the right handle carrier 88 include a left handle carrier guide 90 and a right handle carrier guide 92, respectively, which extend exterior of one side of the handle tube 72 to engage the handle carrier guide plate 94, as will be discussed in further detail below. The handle carriers 86, 88 each have respective body portions 300, 302, each of which includes a respective cavity 304, 306 and a corresponding slot 308, 310 through a partial depth of the body portion 300, 302. The cables 76, 78 may be passed through the slot and in to the cavity 304, 306 of the respective handle carrier 86, 88. An end of the cable may be attached to a stop having an outside dimension greater diameter than the inside dimension of the slot 308, 310 in the body of the handle carriers 86, 88. With this structure, if the cable 76, 78 is placed in tension, the cable end stop exerts a force against an interior surface of the cavity 304, 306 of the handle carrier 86, 88.

FIG. 2 depicts the handle carriers 86, 88 in the handle tube 72. The cables 76, 78 enter at a left and right ends of the handle tube 72. The cables 76, 78 pass through the handle tube 72 until they connect to the corresponding handle carriers 86, 88. The right handle base 56 and the left handle base 54 are mounted on the handle tube 72 at respective locations spaced apart from the ends of the handle tube 72. The handle tube 72 further includes two co-linear slots 130 in which the handle carriers 86, 88 travel. The handle tube 72 may also include holes 312 located adjacent a respective end of the handle tube 72, which are used to mount the housings 68, 70. Extending external of the handle tube 72 are two handle carrier guides 90, 92. The hand carrier guides 90, 92 interact with the handle carrier guide plate 94 as will be discussed in detail below.

A trigger 44 may be mounted on the left hand handle base 54. A proximal handle plate detent element 50, which interacts with the trigger or second detent element 44, is formed on the left side of the proximal handle plate 46. The trigger 44 is biased toward a center of the trigger and twist handle 42, and in to the correspondingly-shaped cavity which forms the detent element 50 of the proximal handle plate 46. The left handle base 54 has a longitudinal groove formed therein in which the trigger 44 travels. The longitudinal groove is sufficiently long to allow the trigger 44 to move clear of the handle plates 46, 48 in order to allow rotation of the handle plates 46, 48.

A left tab 356 and a right tab 358 extend from either end of the proximal handle plate 46 and ride in grooves 352 in the left handle base 54 and right handle base 56.

The handle carrier guide plate 94 mounts to the handle carrier guides 90, 92, and includes a left helical groove 96, and a right helical groove 98 in which the left handle carrier guide 90 and right handle carrier guide 92 travel, as will be discussed in more detail below.

Extending laterally outwardly from an interior of the handle bases 54, 56 are a left housing 68 and a right housing 70. The housings 68, 70 support the handle tube 72 therebetween. Mounted on an outside end of the right handle base 56 is a right end cap 60. Mounted on the outside end of the left handle base 54 is a left end cap 64. Each of the end caps 60, 64 may include a raised portion 66 which acts to prevent a user's hand (not shown) from slipping laterally left or right off of an operative portion 49, defined by the handle plates 46, 48 of the handle 42. In other embodiments, the end caps 60, 64 may be formed without the raised portions 66.

The end caps 60, 64 are mounted on an interior end of each of the left housing 68 and right housing 70, with at least a portion of the corresponding housing 68, 70 extending into an interior of each of the left end cap 60 and right end cap 64, respectively. The cables 76, 78 are supported as they enter an exterior end of the corresponding housings 68, 70 by a guide 84 which allows the cables 76, 78 to freely rotate and translate therethrough.

The left housing 68 and the right housing 70 may have much smaller outer dimensions than their corresponding right hand end cap 60 and left hand end cap 64. When assembled, a frame tube 40 of the handlebar frame element 16 has substantially the same outer dimensions of the end caps 60, 64. When assembled, the right housing 70 and the left housing 68 extend into an interior of the frame tube 40 of the handlebar frame element 16.

A boss 108 may extend from the right handle carrier 88 and a boss 110 extending from the left handle carrier 86, with the bosses 108, 110 placed in co-linear longitudinal grooves 112 on an opposing side of the handle tube 72 in which the co-linear slots 130 are formed. According to one embodiment, the right handle carrier boss 108 and the left handle carrier boss 110 do not extend beyond an outside diameter of the mounting tube 72.

The handle carrier guide plate 94 extends radially outward relative to the handle tube 72 because the handle carrier guide plate 94 has a greater diameter than the handle tube 72. The helical grooves 96, 98 are opposing and thus, the space between the opposing helical grooves 96, 98 narrows between the two helical grooves 96, 98 as they move from one end at which the handle carrier guides 90, 92 rest when the stroller 10 is in an operative position, to an opposite end at which the handle carriers 86, 88 are positioned when the trigger and twist handle 42 is positioned at full twist. In other embodiments, the handle carrier guide plate 94 may have an equal width from top to bottom.

A helical spring 114 is attached at one end to the left end cap 54 and on an opposite end to a generally L-shaped element 362 on the end of the distal handle plate 48, biases the handle tube 72 to rotate as soon as the trigger 44 is released, as will be described in more detail below. The biasing imparted by the helical spring 114 is such that the left handle carrier guide 90 and the right handle carrier guide 92 are biased to an end of the left helical groove 96 and an end of the right helical groove 98 such that the right handle carrier 88 and the left handle carrier 86 are positioned as close together as the right helical groove 98 and the left helical groove 96 will allow. In other embodiments, the trigger and twist handle 42 includes dual helical springs 114 placed symmetrically, that is, with another helical spring 114 symmetrically placed on the opposite side of the trigger and twist handle 42 as well. In those same or other embodiments, other types of springs may be used, for example, a leaf spring or a canted coil spring.

The handle carrier guide plate 94 is held in place between the handle tube 72 and the proximal handle plate 46 by an interior configuration 100 of the proximal handle plate 46. The interior configuration 100 includes two elements 102 extending from an interior surface 104 of the proximal handle plate 46 which correspond to two cut outs 106, one each on the left and right sides of the handle carrier guide plate 94. The connection of the proximal handle plate 46 to the distal handle plate 48 forms a sleeve 49 which sandwiches the handle carrier guide plate 94 between the sleeve 42 and the handle tube 72. The two elements 102 prevent the handle carrier guide plate 94 from moving laterally within the space between the sleeve 49 and the handle tube 72.

The proximal handle plate 46 and distal handle plate 48 are attached to one another and are mounted to the left hand handle base 54 and the right hand handle base 56 by a mounting members 122, for example, a pin, which extends through a common bore formed by mounting elements 124 extending from an interior surface of the proximal handle plate 46 and extending from an interior surface 126 (FIG. 3H) of the distal handle plate 48. When the two plates 46, 48, which are semi-cylindrical, are brought together, they form a cylinder or sleeve, and the mounting elements 124 in each form the common bore through which mounting member 122 is placed and extends into an arcuate slot formed in each of the respective right handle base 56 and left handle base 54.

Figure 5:
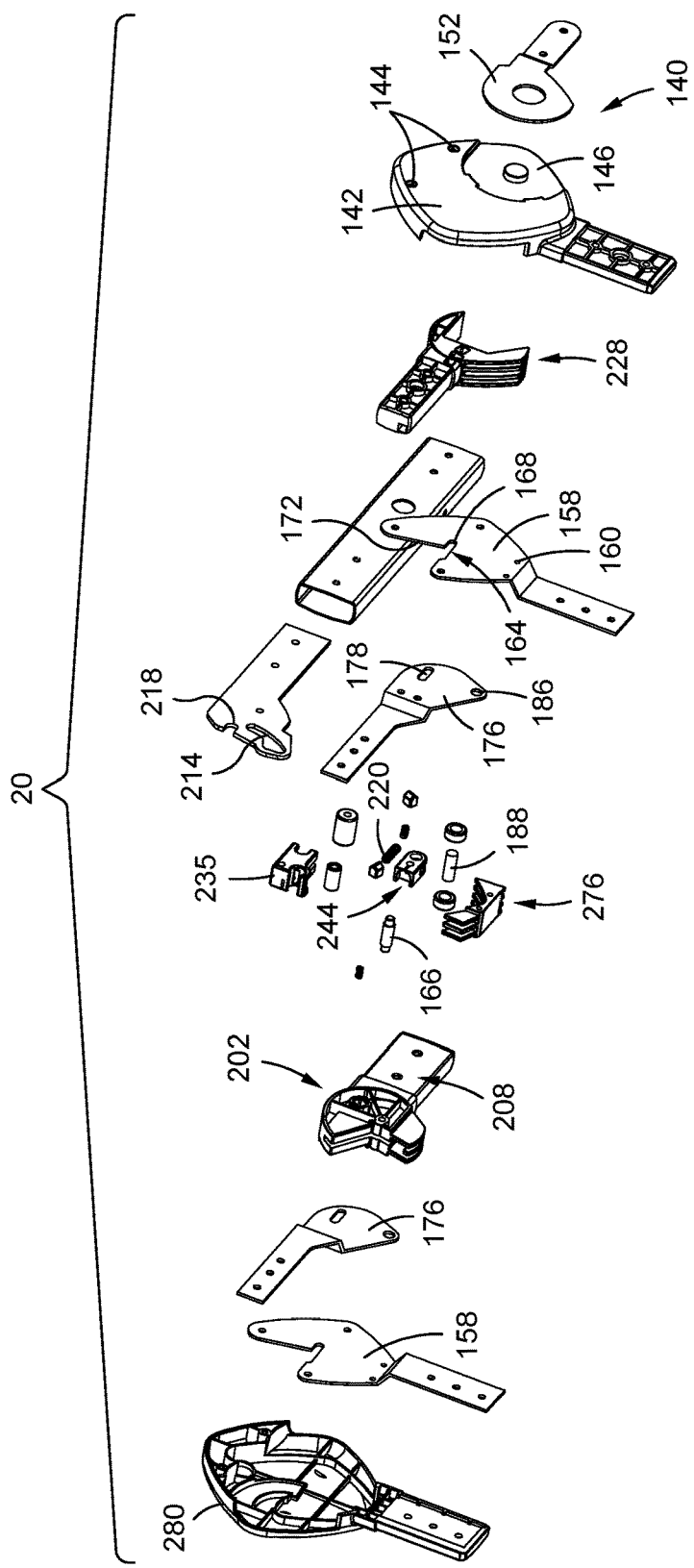
FIG. 5 is an exploded perspective view of a hub assembly of the stroller.
Figure 6:
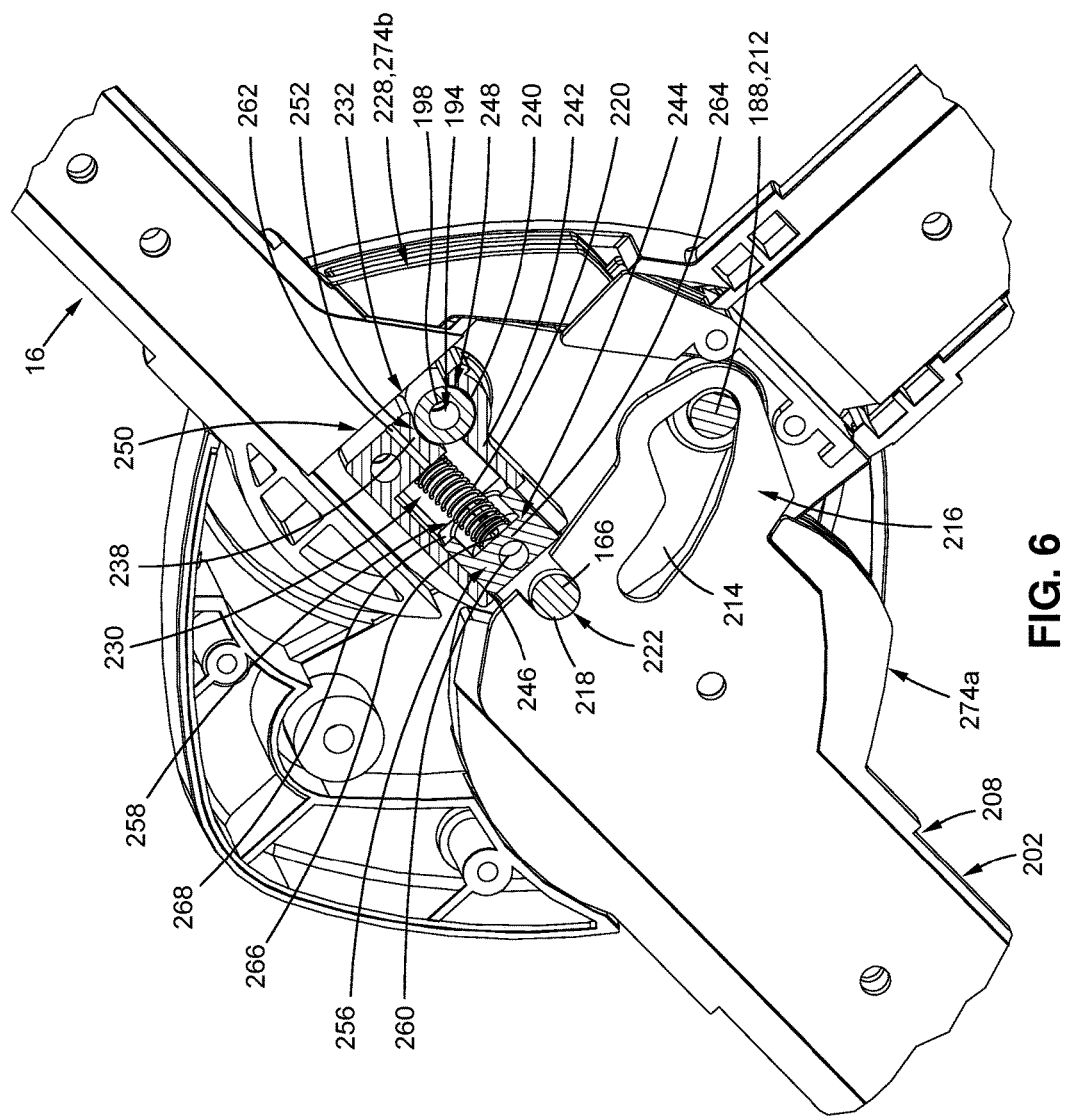
FIG. 6 is a perspective view of internal components of the hub assembly.
Figure 7:
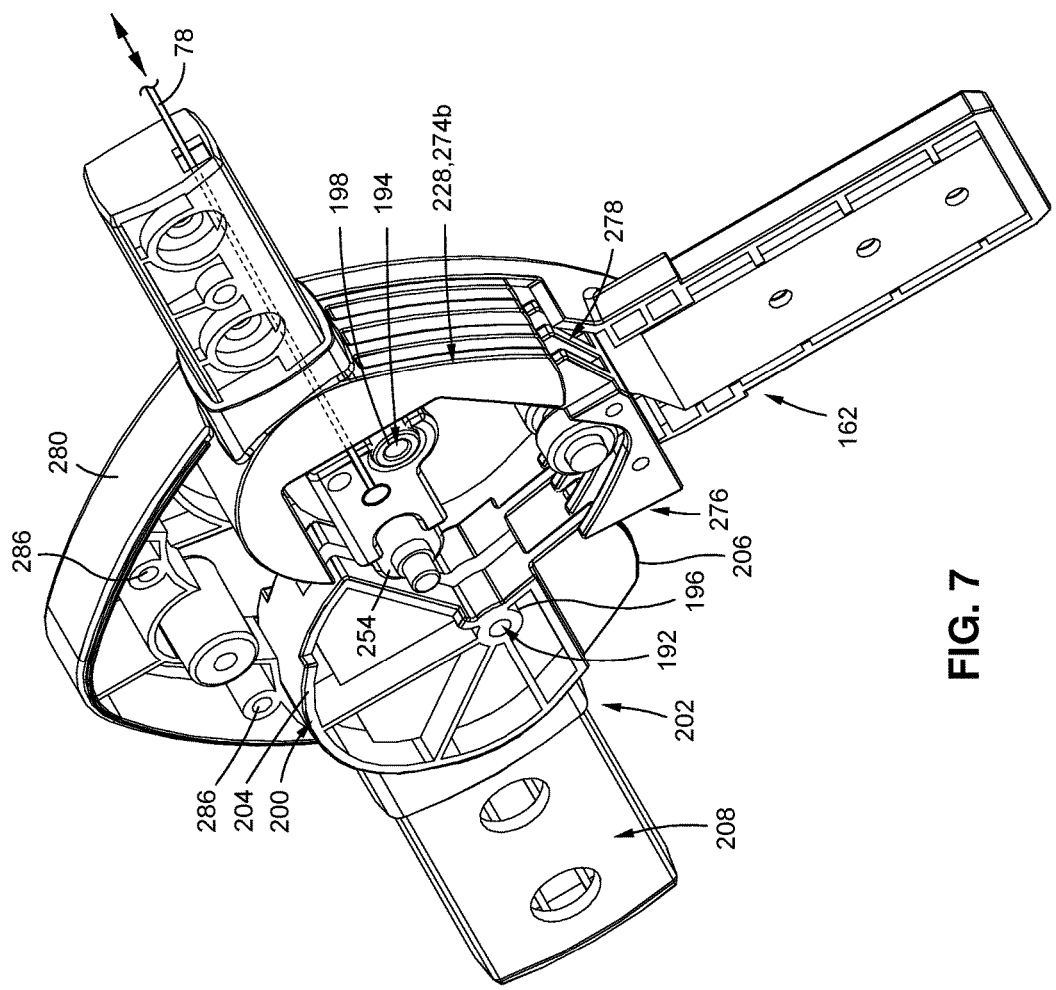
FIG. 7 is another perspective view depicting additional internal features of the hub assembly.

The trigger and twist handle 42 described above is operatively connected to the pair of hubs assemblies 20, with the trigger and twist handle 42 being actuatable to unlock the stroller frame to enable folding thereof. FIG. 5 is an exploded, upper perspective view of the hub assembly 20, while FIGS. 6 and 7 are upper perspective, partially disassembled views of the hub assembly 20 to more clearly depict the relationship between certain internal components of the hub assembly 20.

According to one embodiment, the hub assembly 20 includes an interior base plate 140 (see FIG. 5) including two parts, which combine to form a substantially square shape. A connector cover 142, includes a plurality of openings 144 for connecting the connector cover 142 to other parts of the stroller 10 using mechanical fasteners (not shown). In other embodiments, the connector cover 142 may be connected to the other parts using other means, such as adhesives, or may be integrally formed with other parts. A region 146 of the connector cover 142, corresponding to where the front axle frame member 12 connects, includes a substantially semi-circular cut out. A rotational cover 152, which substantially covers the rotational parts of the front axle frame element 12 in the hub assembly 20, includes an interior surface substantially flush with an interior surface of the connector cover 142. A seam where the two covers 142, 152 meet may have some material removed to reduce friction between the covers during rotation. In other embodiments, the material of the covers 142, 152 may be a reduced friction material, and may have a close fitting seam with covers that remain in contact during rotation. In other embodiments, the interior base plate 140 may be a different shape or orientation, or both.

Internal to the interior base plate 140 is a first camming surface plate 158 attached to the rear axle frame element 14. The first camming surface plate 158 uses a plurality of holes through which bosses attached to the hub assembly 20 or other components hold the attachment portion of the rear axle frame element 14 in place. The shape of the first camming surface plate 158 is truncated in the corner of the hub assembly 20 where the rear axle frame element 14 attaches to accommodate an attachment portion for the rear axle frame member 14. The attachment portion is fixed within the hub assembly 20, preventing movement of the rear axle frame member 14.

Near the center of the first camming surface plate 158 is a camming surface plate slot 164 that is sized to receive a portion of a correspondingly sized release pin 166. The camming surface plate slot 164 has one closed end 168 and an opposite open end. That is, the camming surface plate slot 164 has a closed end 168 against which the release pin 166 rests when the hub assembly 20 is in an extended, or operational position. The opposite end of the camming surface plate slot 164 is open, allowing the release pin 166 to travel out of the camming surface plate slot 164 and on to a camming surface 172. While in the camming surface plate slot 164, the release pin 166 prevents any movement within the hub assembly 20, which would, in turn allow the collapse of the stroller 10. The camming surface 172, along which the release pin 166 or corresponding structure may move when the hub assembly 20 moves from an extended, or operational position, to a collapsed position, forms an acute angle with a far side of the camming surface plate slot 164.

Moving toward the exterior of the hub assembly 20, the hub assembly 20 includes a first cover plate 176, which is coupled to the handlebar frame element 16. The first cover plate 176 covers operative portions of the hub assembly 20 which are discussed in detail below. Similar to other parts of the hub assembly 20, the first cover plate 176 has an asymmetrical shape. The first cover plate 176 has a fully closed slot 178 spaced apart from a perimeter of the first cover plate 176. That is, both ends of the fully closed slot 178 are closed, allowing the same release pin 166 which interacts with the camming surface plate slot 164 to rest against an end of the fully closed slot 178. The first cover plate 176 may also include an aperture 186 in which a boss rests, and additional openings to connect the first cover plate 176 with other parts of the hub assembly 20 using mechanical fasteners.

The front axle frame element 12 and the handlebar frame element 16, attach to and rotate around two different attachment points 192, 194 (see FIG. 7) within the hub assembly 20, both defined by attachment structures 196, 198, which may be, for example, pins, bushings, or bosses. The front axle frame element 12 is attached at, and rotates about, an axis near a center of mass of a front axle hub rotational element 202. A rotation portion 200 of the front axle hub rotational element 202 has a similar asymmetrical shape to those described earlier. That is, the rotation portion 200 has an arcuate portion 204 facing the interior of the hub assembly 20, and a portion 206 which conforms to the outer perimeter of the hub assembly 20.

The front axle hub rotational element 202 further includes a frame attachment portion 208. The outside dimensions of the frame attachment portion 208 correspond to inside dimensions of the front axle frame element tubing. The front axle frame element tubing slides over the frame attachment portion 208 and the two are connected with mechanical fasteners.

The front axle hub rotational element 202 is operatively associated with a second point of attachment at the rear axle attachment structure 212 (see FIG. 6), a portion of which corresponds to the aperture 186 of the first cover plate 176. A portion of the boss 188 moves through a slot 214 in a plate extension 216, which extends from a portion of the front axle hub rotational element 202.

The handlebar frame element 16 similarly is attached at an attachment point 194 via an attachment structure 198, and rotates about, an axis near a center of mass of a handlebar hub rotational element 228. Referring specifically to FIG. 6, a cavity 230 defines a void or surround 232, which corresponds to the attachment structure 198. The surround 232 does not completely encircle the attachment structure 198. For the thickness of both an outer and inner wall of the cavity 230, the surround 232 defines a single arcuate section of greater than 180-degrees, up to approximately 330-degrees. Between the inner wall and outer wall of the cavity 230, the attachment structure 198 is surrounded by pivot element 235 having an upper arcuate section 238 and a lower arcuate section 240. The lower arcuate section 240 is formed by a portion of a wall 242 of a five sided cavity 230, which surrounds a hub carrier 244 to guide the hub carrier 244 during movement and stabilize the hub carrier 244, both while moving and at rest. The cavity 230 terminates with an open end 246 that corresponds to the release pin engagement slot 218 of the front axle rotational element 202. The wall 242, with a longitudinal axis substantially perpendicular to a tangent of the attachment structure 198, at a point of contact with the attachment structure 198, then curves counterclockwise around the attachment structure 198 to define a first contact surface 248. The upper arcuate section 238 is formed through the depth of an end wall 250 of the cavity 230. The end wall 250 defines a second contact surface 252, which has a curvature corresponding to a radius of the attachment structure 198.

Next to the slot 214 on the plate extension 216 is the release pin engagement slot 218, into which a portion of the release pin 166 is biased by a spring 220, which will be explained in greater detail below. The release pin engagement slot 218 has a semi-circular end 222 and straight sides extending from the end points of the semi-circular end. This shape corresponds to the shape of the hub carrier 244.

The hub carrier 244 carries and supports a portion of the release pin 166 and is translatable relative to the pivot element 235 between an extended position and a retracted position, wherein the hub carrier 244 is moved into the pivot element as it travels from the extended position toward the retracted position. The hub carrier 244 has a forked, semi-circular front portion, a middle portion 256 with a lateral cylindrical cavity 260 where a cable end may be stored, a wall 264 with an aperture 266 through which a cable may pass between the middle portion 256, and an end portion 258 which includes a side wall 268 around the perimeter of the hub carrier 244. The fork in the front portion is lateral, with two tines, and a space therebetween. The release pin engagement slot 218 engages the release pin 166 in the space.

A cable 76, 78 may be passed through an opening 262 in the cavity 230, through an interior formed by the spring coils 220, through the aperture 266 in the wall 264 between the middle portion 256 and the end portion 258 of the hub carrier 244, and in to the lateral cylindrical cavity 260 of the middle portion 256 of the hub carrier 244. An end of the cable may be attached to a stop. The stop has an outside dimension greater than the inside dimension of the aperture 266 in the wall 264 between the middle portion 256 and the end portion 258 of the hub carrier 244. With this structure, if the cable is placed in tension, the cable end stop exerts a force against the wall 264 between the middle portion 256 and end portion 258 of the hub carrier 244, against a biasing force, discussed in detail below.

The hub carrier 244 is biased by a helical spring 220 toward the extended position. One end of the helical spring 220 biases against the end wall 250 of the cavity 230, and the opposite end of the spring 220 biases against the wall 264 between the middle portion 256 and end portion 258 of the hub carrier 244. The spring 220 biases the hub carrier 244 and the carrier release pin 166 away from the pivot element 235 and toward a center of the hub assembly 20, and more specifically toward the closed ends 168, 180, 222 of the camming surface plate slot 164 in the first camming surface plate 158, the fully closed slot 178 of the first cover plate 176, and the release pin engagement slot 218 of the plate extension 216, respectively. In other embodiments the hub carrier 244 may be biased by a leaf spring, a canted coil spring, or any spring with enough biasing force and proper dimensions.

The front axle hub rotational element 202 includes a first set of rotational interlocking fingers 274a and the handlebar hub rotational element 228 includes a second set of rotational interlocking fingers 274b. The first and second sets of rotational interlocking fingers 274a, 274b are spaced apart when the stroller 10 is in an operational configuration, but move closer to one another as the stroller 10 moves from an operational configuration to a collapsed configuration. The first set of rotational interlocking fingers 274a interlock with a corresponding first set of fixed interlocking fingers 276 of the rear axle hub member 162. The second set of rotational interlocking fingers 274b interlock with a corresponding second set of fixed interlocking fingers 278 of the rear axle hub member 162. The sets of interlocking fingers 274a, 274b, 276, 278 collectively provide additional lateral structural stability to the front axle frame element 12 and the handlebar frame element 16 when the stroller 10 is in a collapsed configuration. In the embodiment shown, the first set of rotational interlocking fingers 274a has three interlocking fingers, and, correspondingly, the first set of fixed interlocking fingers 276 has two interlocking fingers. The second set of rotational interlocking fingers 274b has four interlocking fingers, and, correspondingly, the second set of fixed interlocking fingers 278 has three interlocking fingers. In other embodiments, the number of interlocking fingers included in the first and second sets of rotational interlocking fingers 274a, 274b and the corresponding number of interlocking fingers included in the first and second sets of fixed interlocking fingers 276, 278 may be reversed, or there may be, for example, as few as two interlocking fingers included in the first and second sets of rotational interlocking fingers 274a, 274b and a single interlocking finger included in the first and second sets of fixed interlocking fingers 276, 278. A thickness of each interlocking finger may vary as well with the number of interlocking fingers used.

The front axle hub rotational element 202 is attached to an exterior base plate 280 so that the front axle hub rotational element 202 rotates relative to the exterior base plate 280, which is on the far side of the hub assembly 20, opposite the interior base plate 140. The attachment portion 208 is rotatable rearward, that is, toward the rear axle frame member 14 when moving to a collapsed position. A second cover plate 176 may cover the exterior side of the above-described operational parts of the hub assembly 20 in substantially the same manner as the first cover plate 176. A second camming surface plate 158 may be connected to an exterior base plate 280 of the hub assembly 20. The second camming surface plate 158 may have the same shape and interacts with a more exterior portion of the release pin 166 in a similar manner to the first camming surface plate 158. The exterior base plate 280 may include two hub plate connection points 286, which are used to connect the exterior base plate 280 to the interior base plate 140.

As indicated above, although only one hub assembly 20 has been described in detail, one of ordinary skill in the art will understand that the opposite hub assembly 20 of the stroller 10 is symmetrical in structure and operation.

Figure 8:
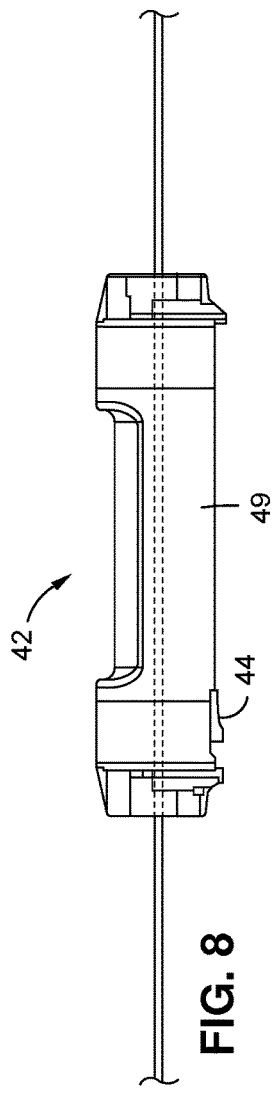
FIGS. 8-11 depict an operation of the trigger and twist handle.
Figure 9:
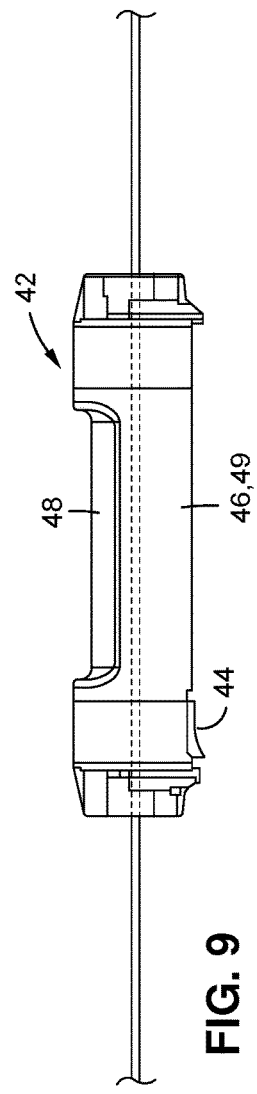
Figure 10:
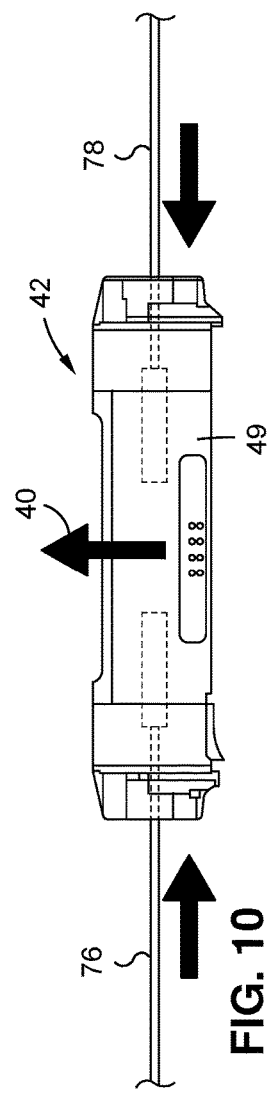
Figure 11:
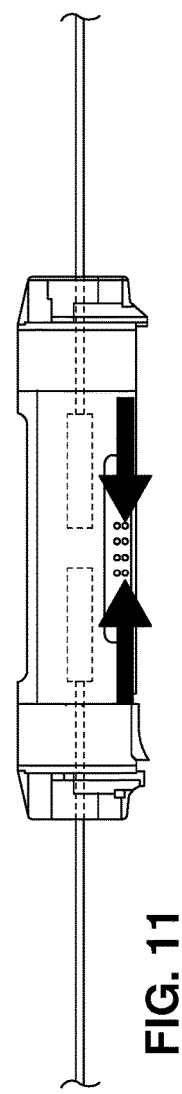

An exemplary operation of the trigger and twist handle 42 and the corresponding hub assemblies 20 will now be described. In operation, and referring to FIG. 8, a user first slides the trigger 44 laterally outward, overcoming the spring bias of the internal spring(s). Once the trigger 44 is clear of the operative handle 49, a position shown in FIG. 9, a user may rotate the operative handle 49 in the direction shown by the arrow 400 in FIG. 10. As the operative handle 49 is rotated, the helical grooves 96, 98 in the handle carrier guide plate 94 draw the stop mounts 86, 88, which are connected to the cables 76, 78 inward toward the center of the handle 42, as is shown by the arrows 402, 404 in FIGS. 10 and 11. As described above, opposite ends of the cables 76, 78 are connected to respective hub carriers 244 in respective ones of the right and left hub assemblies 20. The movement of the stop mounts 86, 88, and, correspondingly, the connected cables 76, 78, in the handle 42 overcomes the bias of the spring 220 biasing the hub carrier 244, and moves the hub carrier 244 and the release pin 166 into the cavity 230 and retracts out of pin engagement slot 218. When the release pin 166, which is connected to the hub carrier 244, clears the release pin engagement slot 218, the front axle frame member 12 is free to rotate, but does not do so because of the force of gravity acting on the front axle frame member 12 due to the wheels 26 of the front axle frame member 12 resting on the surface 360.

Figure 16:
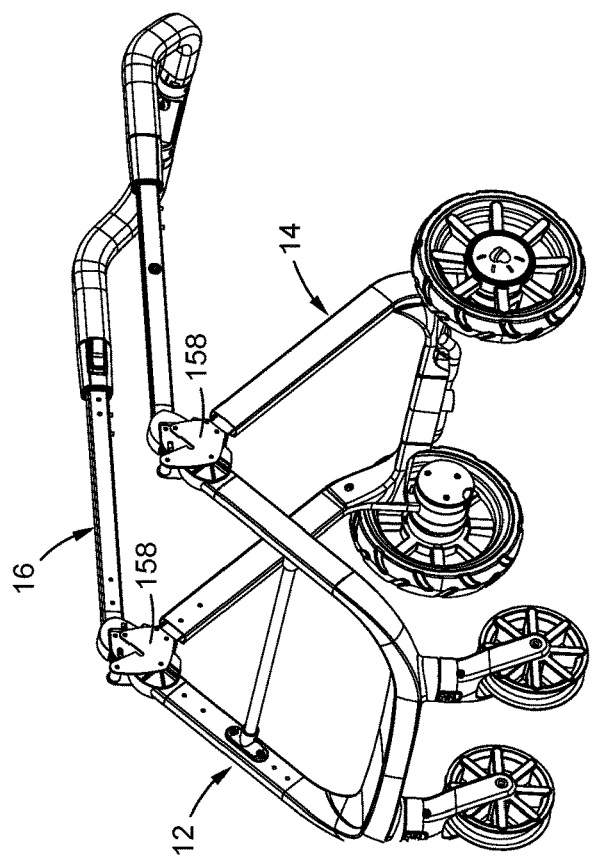
FIG. 16 depicts the stroller frame in the first phase of collapse, i.e., partially collapsed.
Figure 15:
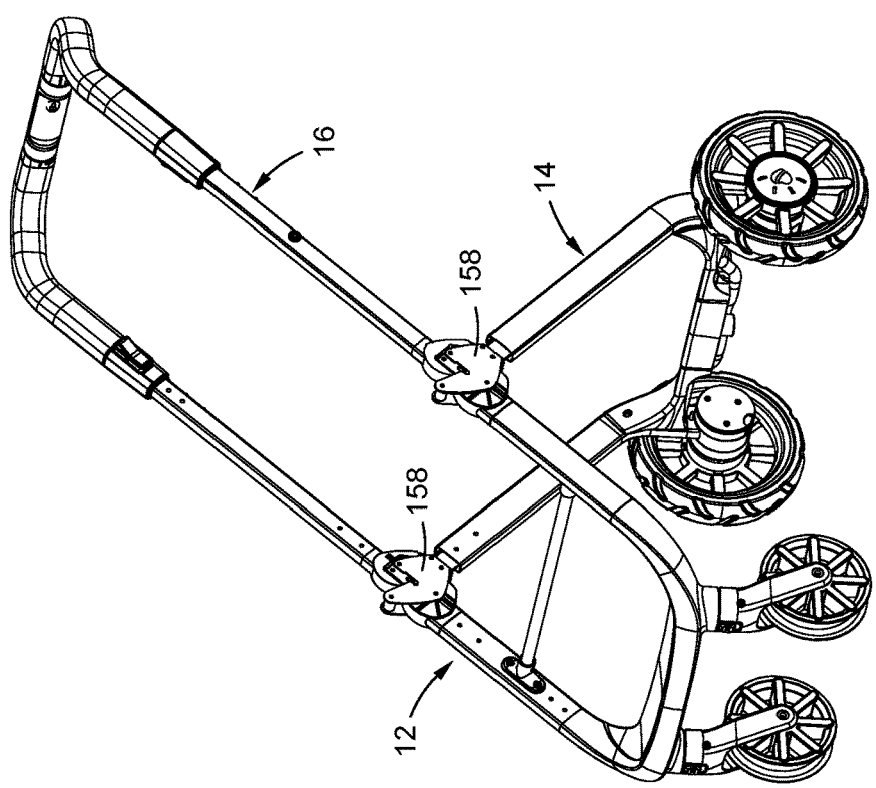
FIG. 15 depicts the stroller frame in the operational configuration.

As is shown in the sequence depicted in FIGS. 12-14, the release pin 166 moves out of the release pin engagement slot 218 in the camming surface plate 158 and on to the camming surface 172. The camming surface 172 is shaped and configured to provide sufficient friction to be in equilibrium with the force of gravity acting on the handlebar frame member 16 as the handlebar frame member 16 approaches a position substantially parallel with the surface 360, as shown in FIG. 16. In this position, a basket or seat 288 may be more easily removed from the stroller 10.

To completely collapse the stroller 10, a user may grasp a handle 290 extending between the hub assemblies 20 and lift the stroller 10, and the force of gravity will continue to rotate the front axle frame member 12 and the handlebar frame member 16 until they are in a position parallel to, and on opposite sides of, the rear axle frame member 14. Thus, the front axle frame member 12 and handlebar frame member 16 rotate in opposite directions toward the real axle frame member 14.

Figure 17:
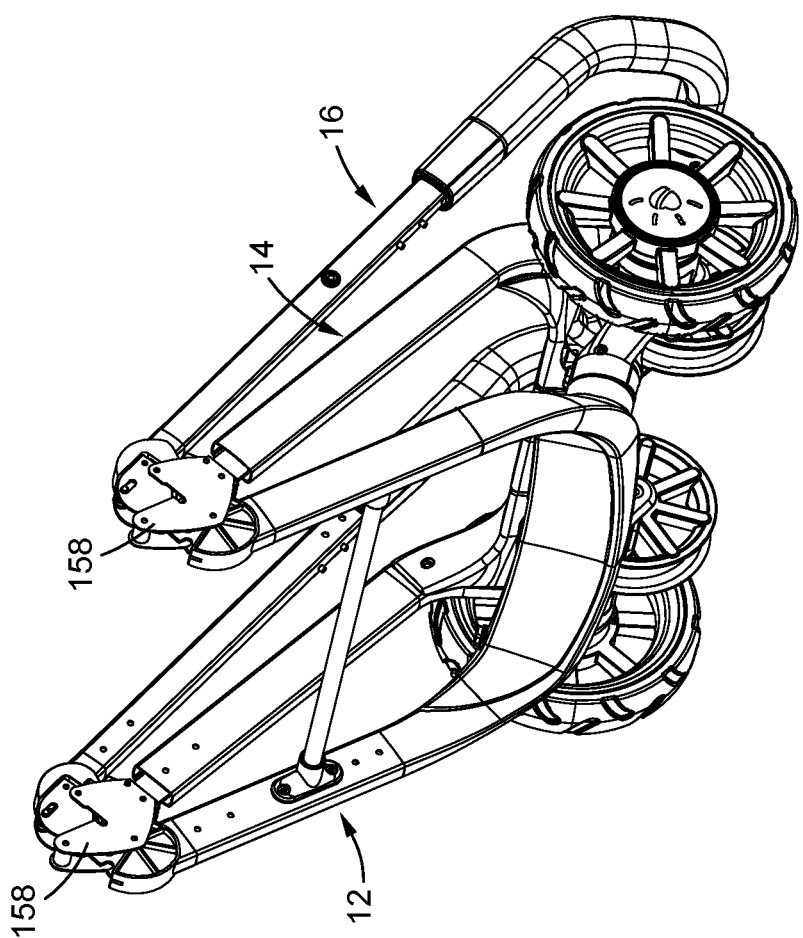
FIG. 17 depicts portions of the stroller frame when the stroller frame is in a fully collapsed configuration.

In a fully collapsed configuration, as shown in FIG. 17, wheels 26 of the front axle 18 are set more narrowly on the front axle 18 than the wheels 26 of the rear axle frame member 14 on set on the rear axle 24. This allows the front axle frame member 12 to fully rotate in to a position substantially parallel to the rear axle frame member 14. This embodiment includes a connection point between the two camming surface plates 158, 284. The two camming surface plates 158, 284 are held together on the side opposite the connection point for the rear axle frame member 14 by a mechanical connector (not shown). A bushing may be placed in between the two camming surface plates 158, 284 to maintain the proper spacing between the two camming surface plates.

The above description is given by way of example, and not limitation. Given the above disclosure, one skilled in the art could devise variations that are within the scope and spirit of the invention disclosed herein, including various ways of attaching frame members to the hub assembly. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A stroller comprising:
   a frame including a forward frame member, a rearward frame member, and a handle frame member; and
   a hub connected to the frame, the frame being transitional relative to the hub between an extended configuration and a collapsed configuration, the handle frame member moving towards the rearward frame member as the frame transitions from the extended configuration toward the collapsed configuration, the hub including:
   a first plate at least partially located within the housing and coupled to the rearward frame member, the first plate having a first slot formed therein and a camming edge; and
   a pin assembly coupled to the handle frame member and moveable relative to the first plate, at least a portion of the pin assembly being received within the first slot when the frame is in the extended configuration, the pin assembly being removed from the first slot when the frame is in the collapsed configuration, the pin assembly interfacing with the camming edge to generate friction therebetween as the frame transitions from the extended configuration toward the collapsed configuration.

2. The stroller recited in claim 1, wherein the frame is transitionable to an intermediate configuration between the extended configuration and the collapsed configuration, the friction between the pin assembly and the camming edge maintaining the frame in the intermediate configuration.

3. The stroller recited in claim 1, wherein the pin assembly includes a pin camming body and a lock pin coupled to the pin camming body, the pin camming body interfacing with the camming edge when the frame transitions from the extended configuration toward the collapsed configuration and the lock pin being received within the first slot when the frame is in the extended configuration, and removed from the first lot when the frame is in the collapsed configuration.

4. The stroller recited in claim 1, further comprising a handle operatively coupled to the pin assembly and rotatably coupled to the handle frame member, the handle being rotatable between a first position and a second position, rotation of the handle from the first position to the second position causing the pin assembly to be removed from the first slot.

5. The stroller recited in claim 4, further comprising a cable extending between the handle and the pin assembly to operatively couple the handle with the pin assembly.

6. The stroller recited in claim 5, wherein the handle includes:
   a pin connected to the cable;
   a first handle body having a linear groove; and
   a second handle body having helical groove and rotatable relative to the first handle body;
   the pin residing in the linear groove and having an end portion in communication with the helical groove, the interaction of the pin with the helical groove and linear groove causing translation of the pin within the linear groove in response to rotation of the second handle body relative to the first handle body.

7. The stroller recited in claim 6, wherein the second handle body is rotatable relative to the first handle body between a first position and a second position, the stroller further comprising a handle lock member engageable with the second handle body when the second handle body is in the first position to restrict rotation of the second handle body, the handle lock member being selectively disengageable from the second handle body to allow for rotation of the second handle body from the first position toward the second position.

8. The stroller recited in claim 1, wherein the handle frame member and the forward frame member pivot relative to the hub about different pivot axes spaced apart from each other.

9. The stroller recited in claim 1, wherein the handle frame member is pivotable toward the rearward frame member in a first rotational direction, and the forward frame member is pivotably toward the rearward frame member in a second rotational direction.

10. A stroller comprising:
a frame including a forward frame member, a rearward frame member, and a handle frame member; and
a hub connected to the frame, the frame being transitional relative to the hub between a first configuration, a second configuration, and a third configuration, the handle frame member moving towards the rearward frame member as the frame transitions from the first configuration toward the third configuration, the second configuration being an intermediate configuration between the first configuration and the third configuration, the hub being configured to selectively maintain the frame in the second configuration, the hub including:
a housing;
a first plate at least partially located within the housing and coupled to the rearward frame member, the first plate having a first slot formed therein; and
a pin assembly coupled to the handle frame member and moveable relative to the first plate, at least a portion of the pin assembly being received within the first slot when the frame is in the first configuration, the pin assembly being removed from the first slot when the frame is in the second configuration and the third configuration.

11. The stroller recited in claim 10, wherein the first plate includes a camming edge and the pin assembly interfaces with the camming edge when the frame is in the second configuration, friction between the pin assembly and the camming edge maintaining the frame in the second configuration.

12. The stroller recited in claim 11, wherein the pin assembly includes a pin camming body and a lock pin coupled to the pin camming body, the pin camming body interfacing with the camming edge when the frame is in the second configuration and the lock pin being received within the first slot when the frame is in the first configuration, and removed from the first lot when the frame is in the second configuration and the third configuration.

13. The stroller recited in claim 12, further comprising a second plate coupled to the rearward frame member and having a second slot formed therein, the lock pin being retained within the second slot.

14. The stroller recited in claim 10, further comprising a handle operatively coupled to the pin assembly and rotatably coupled to the handle frame member, the handle being rotatable between a first position and a second position, rotation of the handle from the first position to the second position causing the pin assembly to be removed from the first slot.

15. The stroller recited in claim 14, further comprising a cable extending between the handle and the pin assembly to operatively couple the handle with the pin assembly.

16. The stroller recited in claim 15, wherein the handle includes:
a pin connected to the cable;
a first handle body having a linear groove; and
a second handle body having helical groove and rotatable relative to the first handle body;
the pin residing in the linear groove and having an end portion in communication with the helical groove, the interaction of the pin with the helical groove and linear groove causing translation of the pin within the linear groove in response to rotation of the second handle body relative to the first handle body.

17. The stroller recited in claim 16, wherein the second handle body is rotatable relative to the first handle body between a first position and a second position, the stroller further comprising a handle lock member engageable with the second handle body when the second handle body is in the first position to restrict rotation of the second handle body, the handle lock member being selectively disengageable from the second handle body to allow for rotation of the second handle body from the first position toward the second position.

18. The stroller recited in claim 10, wherein the handle frame member and the forward frame member pivot relative to the hub about different pivot axes spaced apart from each other.

19. The stroller recited in claim 10, wherein the handle frame member is pivotable toward the rearward frame member in a first rotational direction, and the forward frame member is pivotably toward the rearward frame member in a second rotational direction.

* * * * *